US008996849B2

(12) United States Patent
Matsubara

(10) Patent No.: US 8,996,849 B2
(45) Date of Patent: Mar. 31, 2015

(54) STARTING OF AN IMAGE PROCESSING DEVICE USING PREDETERMINED DATA STORED IN A STORAGE FOR RAPID POWERED ON AND POWER DOWN

(75) Inventor: Masatomo Matsubara, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 261 days.

(21) Appl. No.: 13/528,235

(22) Filed: Jun. 20, 2012

(65) Prior Publication Data
US 2012/0331279 A1 Dec. 27, 2012

(30) Foreign Application Priority Data
Jun. 22, 2011 (JP) ................................. 2011-137948

(51) Int. Cl.
G06F 9/00 (2006.01)
G06F 15/177 (2006.01)
(Continued)

(52) U.S. Cl.
CPC ....... *H04N 1/00339* (2013.01); *H04N 1/00891* (2013.01); *H04N 1/00928* (2013.01); *G06F 11/1441* (2013.01); *G06F 9/4403* (2013.01); *G06F 9/4418* (2013.01);
(Continued)

(58) Field of Classification Search
CPC ..................................... G06F 9/4401
USPC ....................................... 713/2, 1
See application file for complete search history.

(56) References Cited

U.S. PATENT DOCUMENTS 5,410,699 A * 4/1995 Bealkowski et al. ............. 713/2
6,038,669 A * 3/2000 Yang ............................. 713/300
(Continued)

FOREIGN PATENT DOCUMENTS

JP 06-149403 A 5/1994
JP 2001-014050 A 1/2001
(Continued)

OTHER PUBLICATIONS

Office Action dated Oct. 1, 2013, issued by the Japanese Patent Office in the corresponding Japanese Patent Application No. 2011-137948 and an English translation thereof. (5 pages).

Primary Examiner — Thomas Lee
Assistant Examiner — Santosh R Poudel
(74) Attorney, Agent, or Firm — Buchanan Ingersoll & Rooney PC

(57) ABSTRACT

An information processing device, comprises: a connection unit connected to a predetermined storage part storing therein startup mode determination information in which a startup mode corresponds to a specified hardware configuration and/or software configuration is configured and the plurality types of suspend data, each of which corresponds to the respective startup mode; a startup mode determination part for reading the startup mode determination information and determining the startup mode when being powered on; a suspend data obtaining part for selecting the suspend data corresponds to the startup mode determined by the startup mode determination part and obtaining the selected suspend data in the storage part; a starting up part for performing a startup process using the suspend data obtained by the suspend data obtaining part; and a startup mode updating part for updating the startup mode configured in the startup mode determination information after completion of the startup process.

18 Claims, 11 Drawing Sheets

(51) Int. Cl.
  *H04N 1/00* (2006.01)
  *G06F 11/14* (2006.01)
  *G06F 9/44* (2006.01)
  *G06F 1/32* (2006.01)
  *G06F 11/20* (2006.01)

(52) U.S. Cl.
  CPC .......... *H04N 2201/0094* (2013.01); *H04N 2201/0091* (2013.01); *H04N 2201/0082* (2013.01); *G06F 1/3203* (2013.01); *G06F 11/2015* (2013.01)
  USPC .................................. 713/1; 713/2

(56) References Cited

U.S. PATENT DOCUMENTS

| | | | |
|---|---|---|---|
| 6,446,203 B1* | 9/2002 | Aguilar et al. | 713/2 |
| 6,513,113 B1* | 1/2003 | Kobayashi | 713/2 |
| 7,797,525 B2* | 9/2010 | Lee et al. | 713/2 |
| 7,971,045 B1* | 6/2011 | Currid et al. | 713/1 |
| 2002/0027508 A1* | 3/2002 | Baba | 340/693.2 |
| 2004/0250057 A1* | 12/2004 | Fujita et al. | 713/1 |
| 2006/0005016 A1* | 1/2006 | Lee et al. | 713/164 |
| 2007/0220490 A1 | 9/2007 | Kobayashi et al. | |
| 2008/0263349 A1* | 10/2008 | Ota et al. | 713/2 |
| 2009/0049322 A1* | 2/2009 | Chang | 713/340 |
| 2009/0172384 A1* | 7/2009 | Anson | 713/2 |
| 2009/0327463 A1* | 12/2009 | Saito | 709/222 |
| 2010/0077191 A1* | 3/2010 | Hirose | 713/2 |
| 2010/0106952 A1* | 4/2010 | Kawano et al. | 713/1 |

FOREIGN PATENT DOCUMENTS

| | | |
|---|---|---|
| JP | 2006-092481 A | 4/2006 |
| JP | 2007-249418 A | 9/2007 |
| JP | 2007-304914 A | 11/2007 |
| JP | 2009-187134 A | 8/2009 |
| WO | 20101027375 A1 | 3/2010 |

* cited by examiner

INFORMATION PROCESSING DEVICE 1

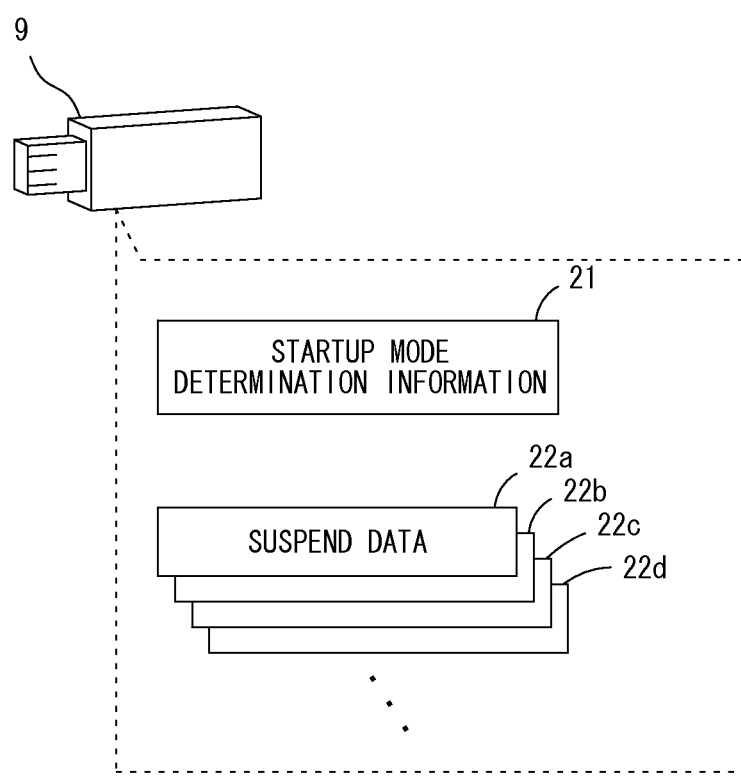

FIG. 5

STARTUP MODE DETERMINATION INFORMATION  21

| STARTUP MODE (CURRENT PROCESS) 21a | PROCESS NUMBER 21b | DEVICE CONFIGURATION 21c | SUSPEND DATA LINK INFORMATION 21d |
|---|---|---|---|
| 「1」 | 1 | HDD : NO<br>HDD SOFTWARE : NO<br>IMAGE PROCESSING UNIT : NO<br>ADVANCED FUNCTION MODULE : NO<br>FAX SECTION : NO<br>EXTENDED MEMORY : NO<br>. . . | SUSPEND DATA 「1」 |
| | 2 | HDD : INSTALLED<br>HDD SOFTWARE : NO<br>IMAGE PROCESSING UNIT : NO<br>ADVANCED FUNCTION MODULE : NO<br>FAX SECTION : NO<br>EXTENDED MEMORY : NO<br>. . . | SUSPEND DATA 「2」 |
| | 3 | HDD : INSTALLED<br>HDD SOFTWARE : NO<br>IMAGE PROCESSING UNIT : NO<br>ADVANCED FUNCTION MODULE : NO<br>FAX SECTION : NO<br>EXTENDED MEMORY : NO<br>. . . | SUSPEND DATA 「3」 |
| | 4 | HDD : INSTALLED<br>HDD SOFTWARE : INSTALLED<br>IMAGE PROCESSING UNIT : NO<br>ADVANCED FUNCTION MODULE : NO<br>FAX SECTION : NO<br>EXTENDED MEMORY : NO<br>. . . | SUSPEND DATA 「4」 |
| | ⋮ | ⋮ | ⋮ |

STARTING OF AN IMAGE PROCESSING DEVICE USING PREDETERMINED DATA STORED IN A STORAGE FOR RAPID POWERED ON AND POWER DOWN

This application is based on the application No. 2011-137948 filed in Japan, the contents of which are hereby incorporated by reference.

BACKGROUND OF THE INVENTION

1. Field of the Invention

The present invention relates to an information processing device such as a printer, a copier or one of MFPs, a method for starting the information processing device up, and a computer readable recording medium.

2. Description of the Background Art

Conventional information processing devices called as printers, copiers or MFPs save data loaded in volatile memories to non-volatile memories when entering one of power saving modes to save more electrical power consumed in power saving modes. This known technique is introduced for example in Japanese Patent Application Laid-Open No. JP 2006-92481 A. By saving the data of volatile memories to non-volatile memories, the information processing devices may interrupt power supplied to the volatile memories. So, less energy consumption is achieved. When powering the information processing device in the power saving mode back on, the data saved in the nonvolatile memory is loaded into the volatile memory and the information processing device is restarted. The information processing device may power back on for a normal state efficiently compared to a usual startup. An efficient start up process using the data saved in the non-volatile memory as described above is defined as a hibernation startup.

According to the conventional above-described technique, it shortens the time of resuming the device powered back on after the hibernation startup. To be more specific, a variety of resuming information is saved in the nonvolatile memory. Any event that causes to resume the information processing device in the power saving mode is occurred, the resuming information of the variety of resuming information corresponds to the event is selected and the information processing device is restarted. As a result, the function corresponds to the event that causes the resuming may become available quickly. According to the conventional above-described technique, when, for example, a user selects a copy function on the information processing device while that is in the power saving mode, the information processing device is resumed to make only the copy function become available quickly.

Through each process of manufacture lines for building the above information processing devices, hardware and software are installed into the information processing device in series. The information processing device is powered on and off repeatedly in each process. For example, installation of the hardware, the power supply should be interrupted. The hardware is installed while the information processing device is powered down. After installation of the hardware, the information processing device is powered back on, so that if the installed hardware activates right is tested. In installation of the software, the information processing device should be powered on. The software is installed while the information processing device is powered on.

It requires the time for the information processing device to complete the startup process if the information processing device is started up through the usual startup process every time the information processing device is powered on in each manufacture line process. The time required for the startup causes the decrease in production efficiency. In order to overcome the problem, the information processing device may be configured to start up through the hibernation startup as described above, for example, when it is powered on in each manufacture line process.

In each manufacture line process to build the information processing device, hardware or software is installed. So, in many cases, the information processing device has its internal configuration different from that at the previous startup. In such cases, even with the data based on the device configuration in the previous process saved in the nonvolatile memory, the hibernation startup using the saved data in the next process is not allowed. So, the hibernation startup is not allowed in each process building the conventional information processing devices, resulting in low efficiency in production.

The above-mentioned problem does not arise for only the manufacture line process building the information processing device. The problem is also encountered in setup operations at a client company after shipment, for example. More specifically, after the information processing device is brought into the client company, an optional device as requested by the client may be installed by a worker. This optional device may be hardware or software. It is often more than one optional device is installed on the information processing device.

The information processing device brought into the client company may be powered on and off repeatedly until its setup operations are complete. It takes time to complete the startup process if the information processing device is started up through the normal startup process every time it is powered on. This causes low efficiency in setup operations.

SUMMARY OF THE INVENTION

The present invention is intended to solve the above problems. Thus, the present invention is intended to provide an information processing device, an information processing device startup method and a computer readable recording medium capable of improving working efficiency by allowing a hibernation startup when the information processing device with its hardware configuration or software configuration changed is powered on.

First, the present invention is directed to an information processing device capable of starting up using suspend data.

According to one aspect of the information processing device, the information processing device, comprises: a connection unit connected to a predetermined storage part storing therein startup mode determination information in which a startup mode corresponds to a specified hardware configuration and/or software configuration is configured and the plurality types of suspend data, each of which corresponds to the respective startup mode; a startup mode determination part for reading said startup mode determination information in said storage part through said connection unit and determining the startup mode when being powered on; a suspend data obtaining part for selecting the suspend data corresponds to the startup mode determined by said startup mode determination part from among said plurality types of suspend data and obtaining the selected suspend data in said storage part; a starting up part for performing a startup process using the suspend data obtained by said suspend data obtaining part; and a startup mode updating part for updating the startup mode configured in said startup mode determination information after completion of the startup process by said starting up part.

Second, the present invention is directed to an information processing device startup method of starting an information processing device up using suspend data.

According to an aspect of the information processing device startup method, the information processing device startup method, comprises the steps of: (a) reading startup mode determination information in which a startup mode corresponds to a specified hardware configuration and/or software configuration is configured in a predetermined storage part in which said startup mode determination information and the plurality types of suspend data, each of which corresponds to the respective startup modes are stored and determining the startup mode when being powered on; (b) selecting the suspend data corresponds to the startup mode determined in said step (a) from among said plurality types of suspend data stored in said storage part and obtaining the selected suspend data; (c) performing a startup process using the suspend data obtained in said step (b); and (d) updating the startup mode configured in said startup mode determination information after completion of the startup process in said step (c).

Third, the present invention is directed to a computer readable recording medium on which a startup program is recorded. The startup program starts an information processing device up using suspend data.

According to an aspect of the computer readable recording medium, the startup program recorded on the recording medium causes the information processing device to execute the steps of: (a) reading startup mode determination information in which a startup mode corresponds to a specified hardware configuration and/or software configuration is configured in a predetermined storage part in which said startup mode determination information and the plurality types of suspend data, each of which corresponds to the respective startup modes are stored and determining the startup mode when being powered on; (b) selecting the suspend data corresponds to the startup mode determined in said step (a) from among said plurality types of suspend data stored in said storage part and obtaining the selected suspend data; (c) performing a startup process using the suspend data obtained in said step (b); and (d) updating the startup mode configured in said startup mode determination information after completion of the startup process in said step (c).

BRIEF DESCRIPTION OF THE DRAWINGS

FIG. 4 shows an example of data stored in an external storage device;

FIG. 5 shows an example of startup mode determination information;

FIG. 8 is a flow diagram explaining an exemplary sequential procedure of the process performed by the CPU as the information processing device powers on;

DESCRIPTION OF THE PRESENT PREFERRED EMBODIMENTS

Figure 1:
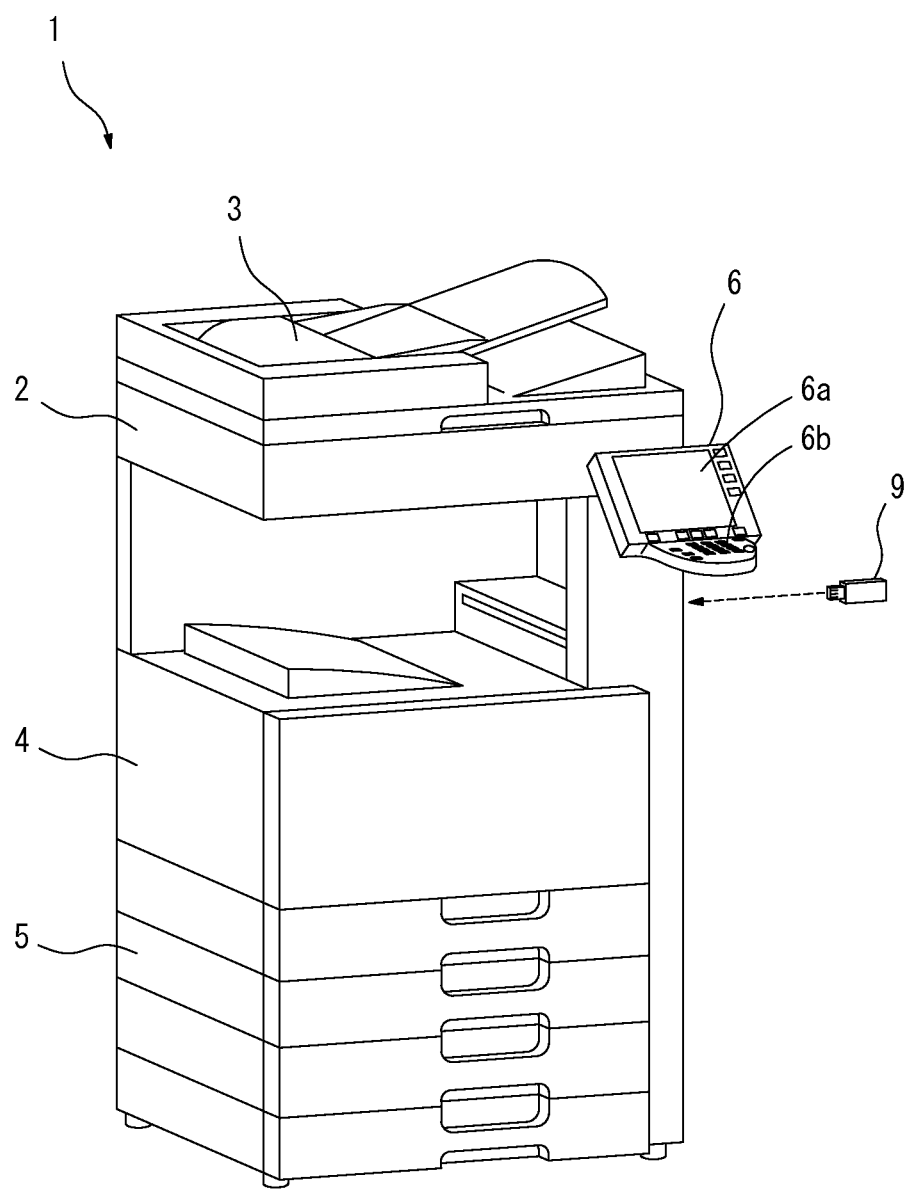
FIG. 1 is an external view schematically illustrating the configuration of an information processing device.

A preferred embodiment of the present invention is described in detail below with reference to figures. In the description given below, those elements which are shared in common among figures are represented by the same reference numerals, and these elements are not discussed repeatedly for the same description.

FIG. 1 is an external view schematically illustrating the configuration of an information processing device 1 according to the present preferred embodiment in the present invention. The information processing device 1 is formed as one of MFPs with multiple functions including a scanner function, a printer function and a copy function, for example.

The information processing device 1 is provided with a scanner section 2 at the upper part of the device body. The scanner section 2 reads images of a document optically and generates image data. An automatic document feeder 3 is provided at the upper part of the scanner section 2. The automatic document feeder 3 feeds each page of the document with multiple pages one by one to an image reading position of the scanner section 2. The scanner section 2 and the automatic document feeder 3 operate simultaneously with each other to enable the scanner section 2 to read the image of a page of the document when the page of the document fed from the automatic document feeder 3 passes through the predetermined image reading position.

The information processing device 1 is provided with a printer section 4 at the central part of the device body. The printer section 4 forms an image and produces a printed output. A sheet feeding section 5 feeds sheets such as printing sheets is provided at the lower part of the printer section 4. The printer section 4 and the sheet feeding section 5 operate simultaneously with each other, so that an image is transferred when the sheet such as the printing sheet fed by the sheet feeding section 5 passes through a predetermined transfer position on the printer section 4 and the printed output is produced after the image is fixed.

The information processing device 1 is also provided with an operational panel 6 which is a user interface operable by a user in use of the information processing device 1 on the front side of the information processing device 1. The operational panel 6 includes a display unit 6a on which various types of information are displayed and an operation input unit 6b which receives entries by the user. The operational panel 6 receives entries by a worker while the information processing device 1 is on a manufacture line before shipment, for instance. When setup operations are performed by a worker at a place where the information processing device 1 is placed after the shipment, the operational panel 6 receives entries by the worker.

A portable external storage device 9 such as a USB (Universal Serial Bus) memory can be plugged into the side part of the device body of the information processing device 1, for example. The external storage device 9 is formed from a data rewritable nonvolatile storage device such as a flash memory, for example.

Figure 2:
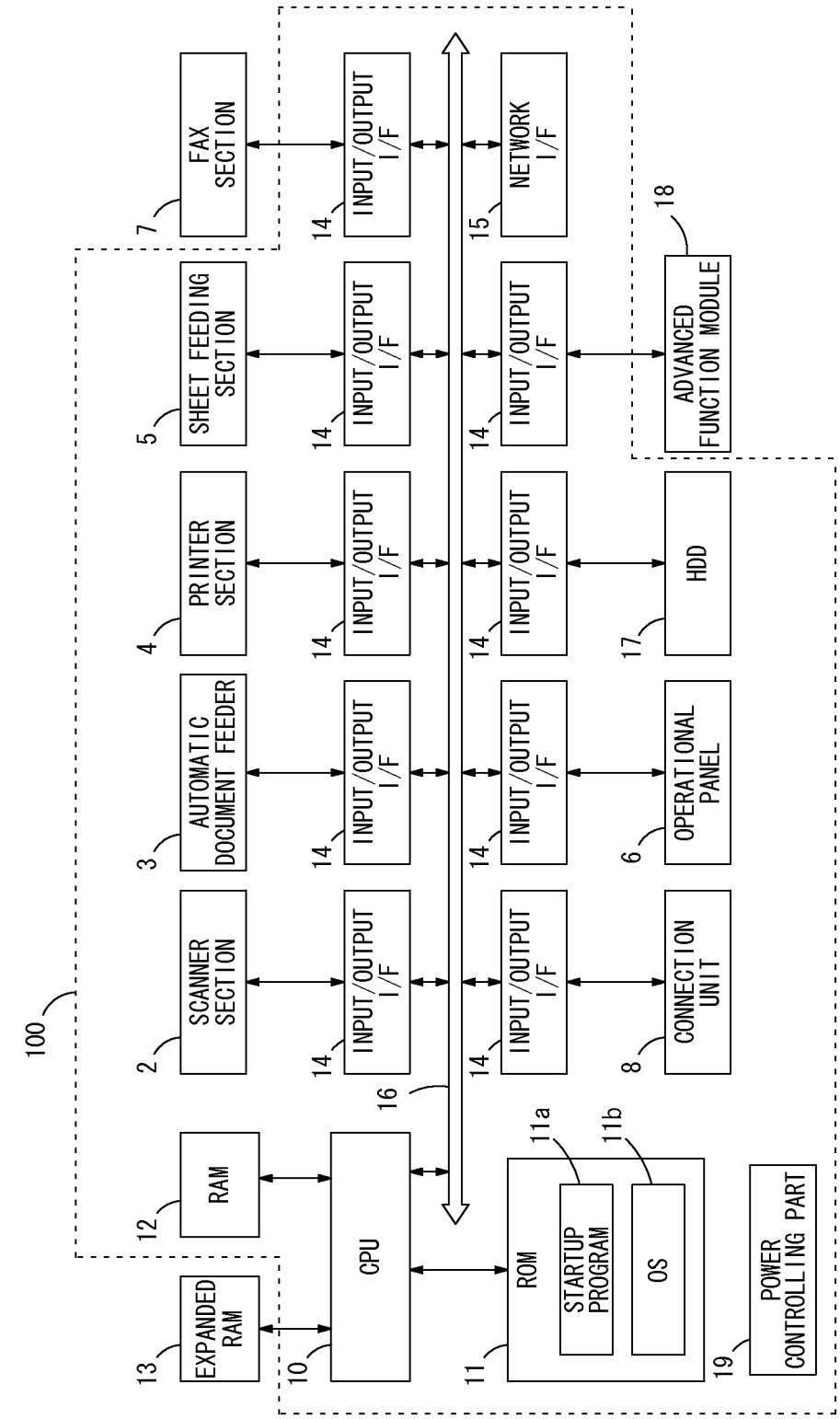
FIG. 2 is a block diagram showing an exemplary internal configuration of the information processing device.

FIG. 2 is a block diagram showing an exemplary internal configuration of the information processing device 1. The information processing device 1 includes a CPU (Central Processing Unit) 10 carries out a variety of computation and controls overall operation of each part. A RAM (Random Access Memory) 12 that is a volatile memory having a predetermined storage capacity and an expanded RAM 13 to increase the storage capacity of the RAM 12 are connected to the CPU 10. The CPU 10 reads and executes a various types of programs stored in a ROM (Read Only Memory) 11, a nonvolatile memory. A startup program 11a executed as the information processing device 1 powers on and an operating system (OS) 11b are stored in the ROM 11. The CPU 10 is connected to a data bus 16 to allow data input and output between the CPU 10 and each part of the information processing device 1.

A plurality of input/output interfaces 14 and a network interface 15 are connected through the data bus 16 besides the CPU 10. The variety of hardware installed on the information processing device 1 is connected to each of the plurality of input/output interfaces 14. The above-described scanner section 2, the automatic document feeder 3, the printer section 4, the sheet feeding section 5 and the operational panel 6 are connected to each respective input/output interface 14. Further, hardware such as a fax section 7, a connection unit 8, a hard disk device 17 and an advanced function module 18 may be connected to each respective input/output interface 14 as illustrated in FIG. 2.

The fax section 7 transmits and receives fax data through public phone lines, which are not shown in FIG. 2. The connection unit 8 is an interface to connect with the external storage device 9. The connection unit 8 allows data input and output while being attached by the external storage device 9. The hard disk device 17 formed from a nonvolatile storage device stores therein, for example, an image data or software including a variety of application programs executed by the CPU 10. The advanced function module 18 allows one or more advanced functions to be available on the information processing device 1. The advanced function module 18 is a module such as an image processing board enabling a specific image processing that is not included as a standard function to be available. More than one advanced function module 18 may be connected. The more than one advanced function modules 18 may be connected to each respective input/output interface 14. The fax section 7, the hard disk device 17 and the advanced function module 18 of the above-mentioned parts, for example, are optional devices that may be installed depending on client's request. These devices are installed on the information processing device 1 through each process of the manufacture line or setup operations of the information processing device 1.

The network interface 15 is to connect the information processing device 1 to a network such as LAN (Local Area Network).

As shown in FIG. 2, the information processing device 1 includes a power controlling part 19 connected to an external power such as a commercial power supply. The power controlling part 19 includes a power switch for the power supply installed in the information processing device 1 and the interruption of the power supply. In response to turning on the power switch, the power controlling part 19 starts the power supply to each part through the external power. In response to turning off the power switch, the power controlling part 19 interrupts the power supply to each part through the external power.

For the above-described information processing device 1, the configuration within a broken line in FIG. 2 is a configuration 100, the initial state of shipment. The configuration 100 is brought to completion through installation of the hardware and that of the software in each manufacture line process building the information processing device 1. The information processing device 1 having the completed configuration 100 is shipped and carried into a client company. The worker conducts some setup operations on the information processing device 1 having the configuration 100, the initial state of shipment after that is carried into the client company. One or more optional devices (hardware or software) as required by the client are installed by the worker in each process of the setup operations. In the example of FIG. 2, the expanded RAM 13, the fax section 7 and the advanced function module 18 not included in the configuration 100 at the initial shipment are installed on the information processing device 1 through the setup operations.

Figure 3:
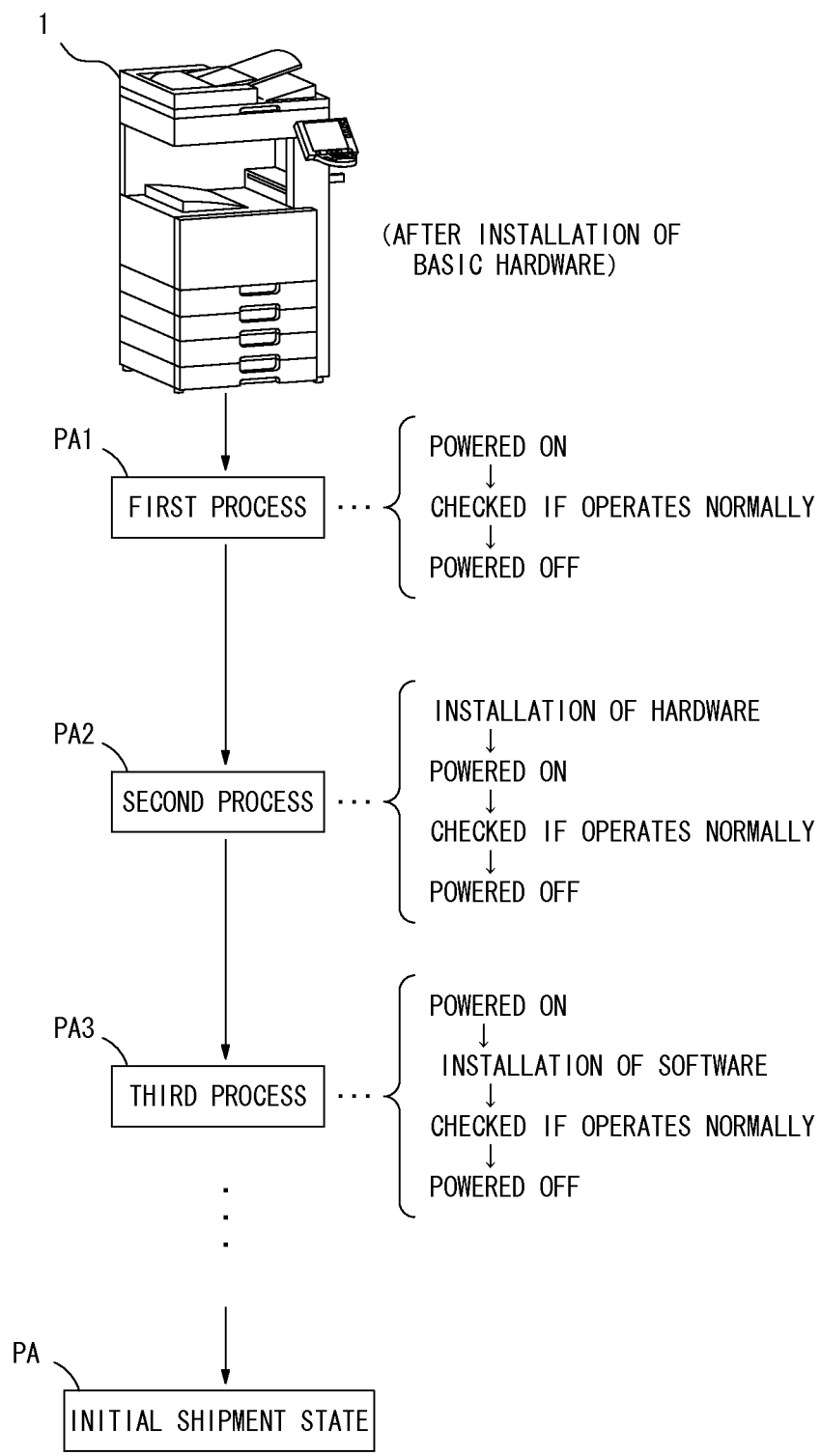
FIG. 3 shows an exemplary operation of powering on and off in each manufacture line process building the information processing device.

Each process of manufacture line building the information processing device 1 is explained. FIG. 3 shows an exemplary operation of powering on and off in each manufacture line process building the information processing device 1. The information processing device 1 is come to an initial shipment state PA through a first process PA1, a second process PA2, a third process PA3 of the manufacture line.

In the first process PA1, for instance, it is checked if the basic hardware such as the CPU 10, the ROM 11, the RAM 12, the power controlling part 19, the connection unit 8, the scanner section 2, the automatic document feeder 3, the sheet feeding section 5 and the operational panel 6 installed on the information processing device 1 operates normally after the installation thereof. In the first process PA1, the information processing device 1 powers on and it is checked that if the installed basic hardware operates normally. After it is confirmed that the installed basic hardware operates normally, the information processing device 1 is powered back off. The information processing device 1 powers on as the power switch is turned on and powers off as the power switch is turned off.

In the second process PA2, whereas the above-mentioned basic hardware, the optional device such as the hardware device 17 is installed. Such device is, for example, factory-installed optional. In the second process PA2, the information processing device 1 is powered on after the installation of the hardware and it is checked that if the newly installed hardware operates normally. After it is confirmed that the installed hardware operates normally, the information processing device 1 is powered back off.

In the third process PA3, whereas the above-mentioned hardware device 17 installed in the second process PA2, the factory-installed optional software, for example, is installed. In the third process PA3, the information processing device 1 is powered on and the software is installed while the information processing device 1 is in an operation state. After the installation of the software, it is checked that if the installed software operates normally. After it is confirmed that the installed software operates normally, the information processing device 1 is powered back off.

Through the above-described process performed as required in series, the information processing device 1 is finally come to the initial shipment state PA having the configuration 100 of FIG. 2. The contents of the operations performed in each process PA1, PA2 and PA3 of the above-described manufacture line are defined in advance.

The operations in each above-described process PA1, PA2 and PA3 are performed on the information processing device 1 with the connection unit 8 to which the external storage device 9 being attached. So, in the present preferred embodiment, the information processing device 1 with the connection unit 8 to which the external storage device 9 being attached is brought to each process PA1, PA2 and PA3 and is powered on and off in each process PA1, PA2 and PA3.

As the information processing device 1 is powered on and the power supply to each part is started by the power controlling part 19 in each process PA1, PA2 and PA3, the CPU 10 reads and executes the startup program 11a, thereby starting the operating system 11b up. The CPU 10 is capable of starting up through the hibernation startup using the data stored in advance in the external storage device 9 attached to the connection unit 8.

FIG. 4 shows an example of the data stored in the external storage device 9. The external storage device 9 stores therein in advance startup mode determination information 21 and a plurality of suspend data 22a, 22b, 22c and 22d as shown in FIG. 4. The startup mode determination information 21 is referred to for determination of a startup mode corresponds to the current process. Each of the suspend data 22a, 22b, 22c and 22d is generated in advance based on the hardware configuration and the software configuration corresponds to each respective process PA1, PA2 and PA3. By way of example, the suspend data 22a is generated in advance based on the hardware configuration and the software configuration of the information processing device 1 being powered on in the first process PA1. The suspend data 22b is generated in advance based on the hardware configuration and the software configuration of the information processing device 1 being powered on in the second process PA2, and the suspend data 22c is generated in advance based on the hardware configuration and the software configuration of the information processing device 1 being powered on in the third process PA3. Further, the suspend data 22d corresponds to another process different from any of the process PA1, PA2 or PA3.

The external storage device 9 stores therein in advance the plurality of suspend data 22a, 22b, 22c and 22d, each of which corresponds to the respective process PA1, PA2 and PA3. When the power supply is started and the CPU 10 starts the operating system 11b up, the CPU 10 reads the suspend data corresponds to the current process in the external storage device 9 and loads the read suspend data into the RAM 12, thereby starting up through the hibernation startup. In order to perform the hibernation startup normally, the CPU 10 is necessary to accurately identify the current process of the manufacture line. To be more specific, it should be accurately identified that the current process fits into what process of the plurality of process PA1, PA2 and PA3. In response to powering on, the CPU 10, therefore, reads the startup mode determination information 21 and identifies the current process. The CPU 10 then determines a startup mode on a basis of the result.

FIG. 5 shows an example of the startup mode determination information 21. Information of a startup mode 21a, a process number 21b, a device configuration 21c and suspend data link information 21d are recorded as the startup mode determination information 21 as shown in FIG. 5. The information of the startup mode 21a shows the current process, and that corresponds to one of a plurality of process numbers is recorded as the process number 21b. In the example of FIG. 5, "1" is shown as the startup mode 21a, which means that the current process is the process corresponds to the process number "1."

The plurality of process numbers are recorded as the process number 21b of the startup mode determination information 21. Each of the plurality of process numbers matches each respective process PA1, PA2 and PA3. More specifically, the process number matching the first process PA1 is "1," and the one matching the second process PA2 is "2." It is configured to add one to the process number as one process of the manufacture line moves on.

The information corresponds to each of the plurality of process numbers recorded as the process number 21b is separately recorded as the device configuration 21c and the suspend data link information 21d. The information defining the hardware configuration and the software configuration of the information processing device 1 being powered on in the process corresponds to each process number, for example, is recorded as the device configuration information 21c. Such information is recorded in advance for each respective process number. The information to designate the suspend data to be read for appropriate hibernation startup when the information processing device 1 is powered on in the process corresponds to each process number is recorded as the suspend data link information 21d. One of the plurality of suspend data 22a, 22b, 22c and 22d in the external storage device 9 is designated and recorded as the suspend data link information 21d.

The CPU 10 determines the startup mode by referring to the above-described startup mode determination information 21. To be more specific, in response to powering on by the power controlling part 19, the CPU 10 executes the startup program 11a and reads the startup mode determination information 21 in the external storage device 9 through the connection unit 8. The CPU 10 further reads the information registered as the startup mode 21a in the startup mode determination information 21 to determine the startup mode. When the hibernation startup using one of the plurality of suspend data 22a, 22b, 22c and 22d in the external storage device 9 is allowed to be performed, the CPU 10 reads the suspend data corresponding to the current process and loads the read suspend data into the RAM 12, thereby performing the hibernation startup. As the load of the suspend data into the RAM 12 is complete, the startup process is complete.

The hibernation startup is a startup method to quickly reproduce the state where the operating system 11b being completely started up and make the startup process complete by loading the suspend data into the RAM 12. It only takes, for example, about few seconds to complete the startup process after the power switch is turned on when the information processing device 1 is started up through this hibernation startup.

In the usual startup, which is different from the hibernation startup, the CPU 10 is required to detect the hardware connected to each input/output interface 14 one by one and save the data corresponding to each hardware to the RAM 12 by making computation one by one. For the software installed on the hardware device 17, the CPU 10 is required to save the data corresponding to the installed software to the RAM 12 by making computation one by one. So, it takes about few minutes at the quickest to complete the normal startup. In the present preferred embodiment, as described later, when the hibernation startup is not allowed, the usual startup may be performed.

After the startup of the operating system 11b of the information processing device 1 is complete, the CPU 10 completes the execution of the startup program 11a. In the present preferred embodiment, however, the CPU 10 causes a part of the functions of the startup program 11a remained even the startup is complete. As an instruction indicating that the operations in the current process are complete normally given by the worker is received through the operational panel 6, the CPU 10 updates the startup mode 21a in the startup mode determination information 21 with the part of the functions of the startup program 11a. When the worker turns off the power switch without giving the instruction indicating that the operations in the current process are complete normally, the CPU 10 configures abnormal end information with the part of the functions of the startup program 11a before the power supplied by the power controlling part 19 is interrupted. The CPU 10 executes the startup program 11a to perform the startup process as the power switch is turned back on next. In the startup process, it is determined if the operations in the previous process are complete normally by referring to the abnormal end information. The function of the CPU 10 is described more in detailed below.

Figure 6:
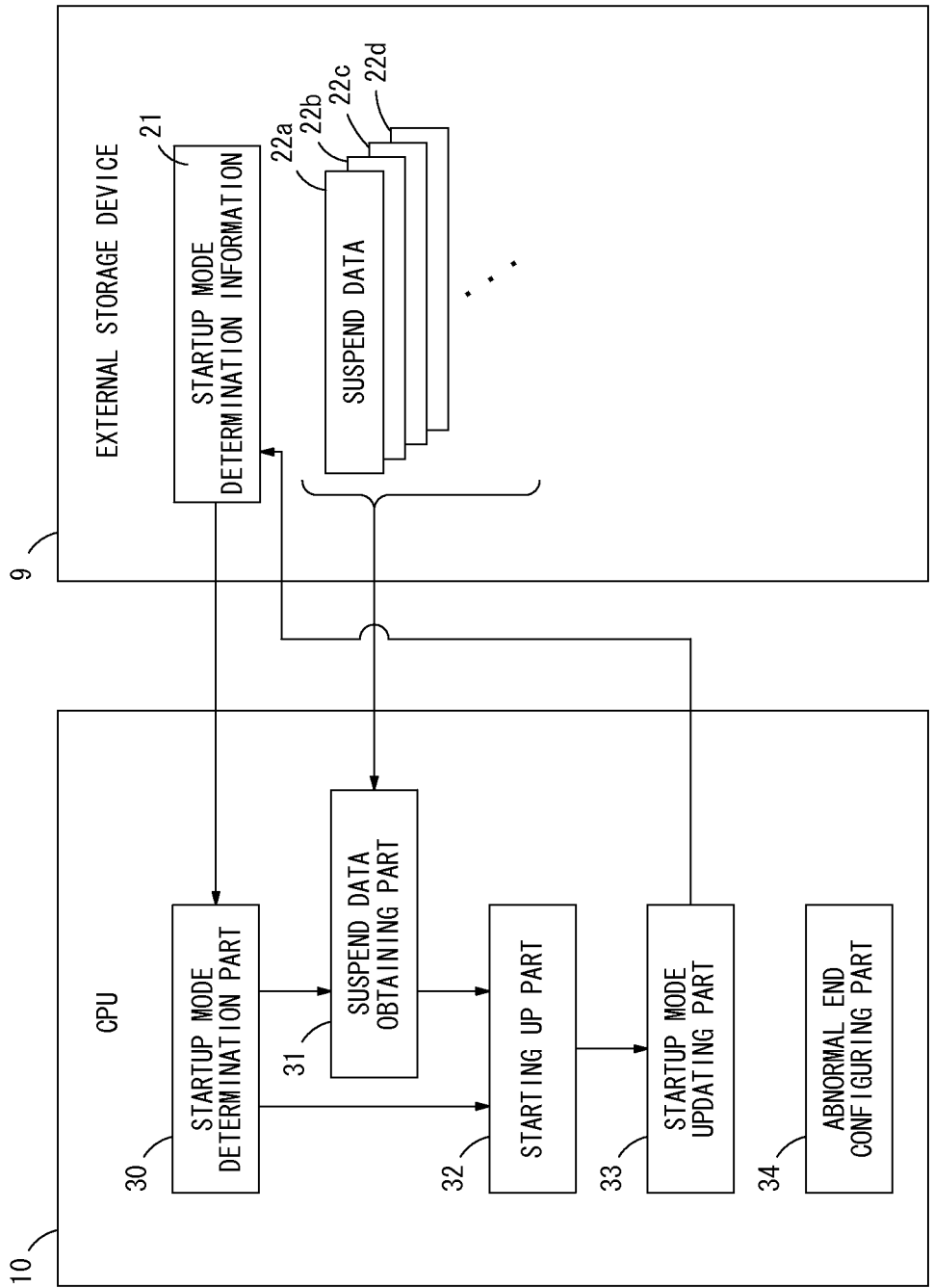
FIG. 6 is a block diagram showing the functional configuration realized by execution of a startup program.

FIG. 6 is a block diagram showing the functional configuration realized by execution of the startup program 11a by the CPU 10. The CPU 10 serves as a startup mode determination part 30, a suspend data obtaining part 31, a starting up part 32, a startup mode updating part 33 and an abnormal end configuring part 34 realized by execution of the startup program 11a. The startup mode determination part 30, the suspend data obtaining part 31 and the starting up part 32 become operative in response to powering on to perform the startup process. The startup mode updating part 33 and the abnormal end configuring part 34 become operative after the completion of the startup process.

The startup mode determination part 30 determines the startup mode of the information processing device 1 when the information processing device 1 is powered on. The startup mode determination part 30 determines whether to perform the hibernation startup or the usual startup based on if the abnormal end information is configured. When no abnormal end information is configured, for example, it is considered that the operations in the previous process are complete normally. The startup mode determination part 30, therefore, determines to perform the hibernation startup. In this case, the startup mode determination part 30 reads the startup mode determination information 21 in the external storage device 9 and identifies the current process based on the startup mode 21a. The startup mode determination part 30 then reads the suspend data link information 21d corresponds to the current process and outputs the read suspend data link information 21d to the suspend data obtaining part 31.

With the abnormal end information configured, it is considered that the operations in the previous process may not be complete normally. In this case, the startup mode determination part 30 establishes data communication with the hardware connected to each respective input/output interface 14 through the data bus 16, thereby obtaining the hardware configuration and the software configuration actually incorporated in the information processing device 1 at that point of time. The startup mode determination part 30 reads the startup mode determination information 21 in the external storage device 9 and identifies the current process recorded as the startup mode 21a. The startup mode determination part 30 then obtains the information of the device configuration 21c corresponds to the current process in the startup mode determination information 21. The startup mode determination part 30 compares the actual hardware configuration and the software configuration with the information of the device configuration 21c to determine if they match with each other.

When the actual hardware configuration and the software configuration match the information of the device configuration 21c, the startup mode determination part 30 determines to perform the hibernation startup. In this case, as described above, the startup mode determination part 30 identifies the current process based on the startup mode 21a. The startup mode determination part 30 then reads the suspend data link information 21d corresponds to the current process and outputs the read suspend data link information 21d to the suspend data obtaining part 31.

When the actual hardware configuration and the software configuration do not match the information of the device configuration 21c, the startup mode determination part 30 determines to perform the usual startup. The startup mode determination part 30 gives an instruction to perform the usual startup to the starting up part 32 without putting the suspend data obtaining part 31 into operation.

The suspend data obtaining part 31 is put into operation when the startup mode determination part 30 determines to perform the hibernation startup. The suspend data obtaining part 31 obtains the suspend data corresponds to the current process from among the plurality of suspend data 22a, 22b, 22c and 22d stored in the external storage device 9 based on the suspend data link information 21d received from the startup mode determination part 30. The suspend data obtaining part 31 outputs the obtained suspend data to the starting up part 32 while giving the instruction to perform the hibernation startup to the starting up part 32.

The starting up part 32 performs the startup process in the startup mode determined by the startup mode determination part 30. As the startup mode determination part 30 determines to perform the hibernation startup, the starting up part 32 loads the suspend data obtained by the suspend data obtaining part 31 into the RAM 12, thereby performing the hibernation startup. In cases where the startup mode determination part 30 determines to perform the usual startup, the starting up part 32 starts the usual startup process and loads the necessary data into the RAM 12 in series without using the suspend data in the external storage device 9, thereby starting the information processing device 1 up. At the time of the completion of the startup process by the starting up part 32, the CPU 10 has started the operating system 11b. So, the CPU 10 terminates the functions of startup mode determination part 30, the suspend data obtaining part 31 and the starting up part 32 that are not necessary in the rest of the process.

In response to completion of the startup process by the starting up part 32, the CPU 10 puts the startup mode updating part 33 into operation. The startup mode updating part 33 updates the startup mode 21a recorded in the startup mode determination information 21 when the worker completes the predetermined operations normally while the information processing device 1 being in the operation state. As receiving the instruction indicating that the operations in the current process are complete normally by the worker through the operational panel 6, the startup mode updating part 33 determines that the predetermined operations are complete normally. In such a case, an increment of one in the information (process number) recorded as the startup mode 21a in the startup mode determination information 21 is made and the startup mode updating part 33 updates the startup mode 21a. As a result, the startup mode 21a is updated to show the next process. The startup mode updating part 33 updates the startup mode 21a just once after the completion of the startup process starting the information processing device 1 up. After the startup mode updating part 33 updates the startup mode 21a, the CPU 10 terminates the function of the startup mode updating part 33. The CPU 10 terminates the function of the abnormal end configuring part 34 with the termination of the function of the startup mode updating part 33.

When the information processing device 1 is powered off without the update of the startup mode 21a by the startup mode updating part 33 as described above, the abnormal end configuring part 34 is put into operation to configure the abnormal end information. The abnormal end configuring part 34 configures the abnormal end information prior to interruption of the power supplied by the power controlling part 19.

Figure 7:
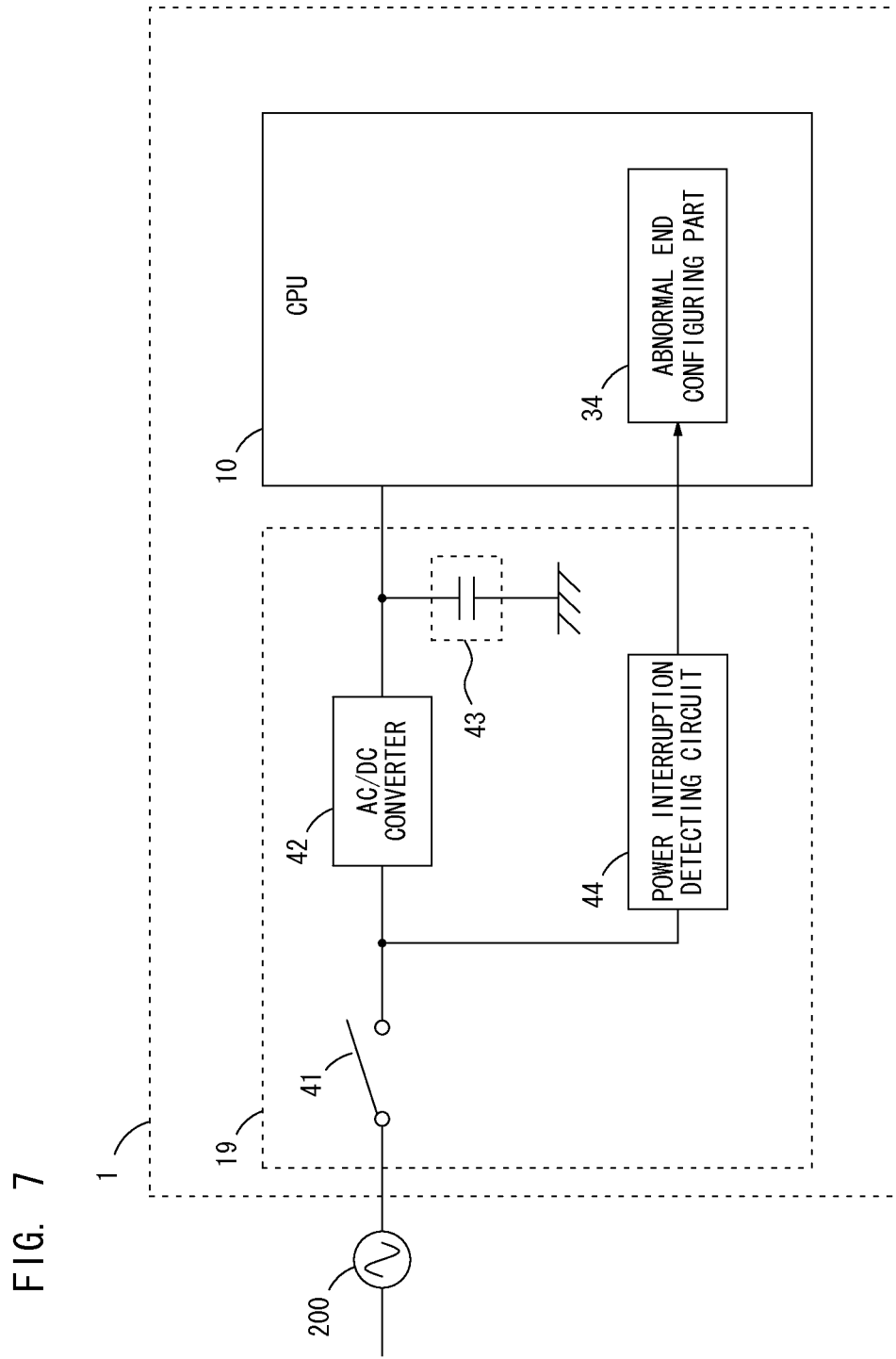
FIG. 7 is a block diagram showing the exemplary form of connection between a power controlling part and a CPU.

FIG. 7 is a block diagram showing the exemplary configuration of the power controlling part 19 and the CPU 10. The power controlling part 19 includes a power switch 41 connected to an external power 200, an AC/DC converter 42, a delay off circuit 43 and a power interruption detecting circuit 44. As the power switch 41 is turned on, the AC/DC converter 42 converts the power (AC) supplied through the external power 200 to a predetermined volts DC and starts the power supply to the CPU 10. As the power switch 41 is turned off, the delay off circuit 43 provided between the AC/DC converter 42 and the CPU 10 becomes operative. The delay off circuit 43 delays the interruption of the power supply for a certain period of time. Also, the power interruption detecting circuit 44 detects the interruption of the power supplied through the external power 200 when the power switch 41 is turned off. In response to the detection of the interruption of the power supply, the power interruption detecting circuit 44 immediately outputs the information to the abnormal end configuring part 34. As a result, the abnormal end configuring part 34 is allowed to configure the abnormal end information before the power supply to the CPU 10 is cut when the interruption of the power supply is detected by the power interruption detecting circuit 44.

The abnormal end information configured by the abnormal end configuring part 34 is saved to the device such as, for example, the external storage device 9 or the hard disk device 17, or a certain storage region in the nonvolatile memory which is not shown in figures. Even after the power supply to the information processing device 1 is cut, the saved abnormal end information is retained. So, the startup mode determination part 30 may determine if the abnormal end information is configured when the information processing device 1 powers back on.

Figure 8:
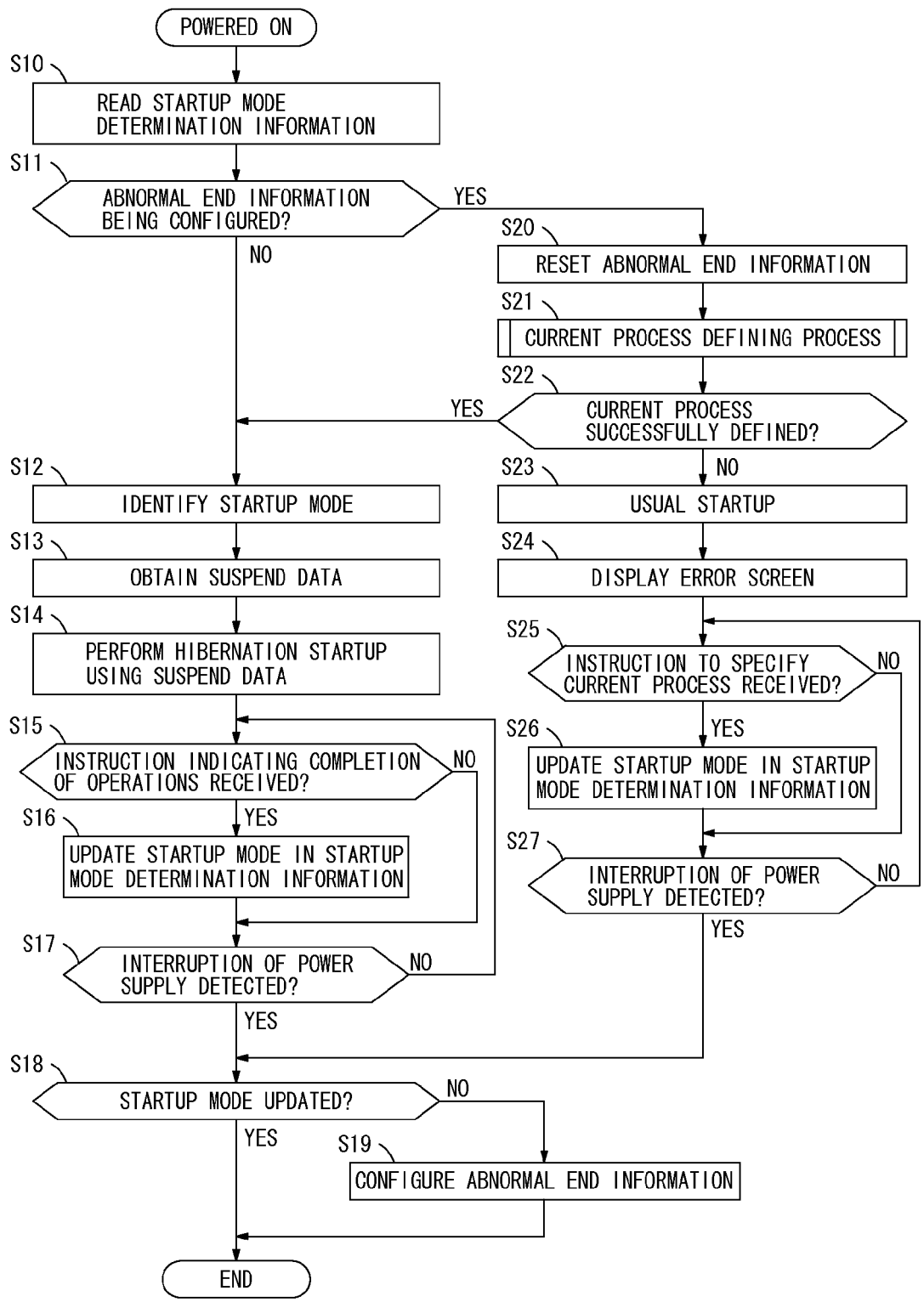
Figure 9:
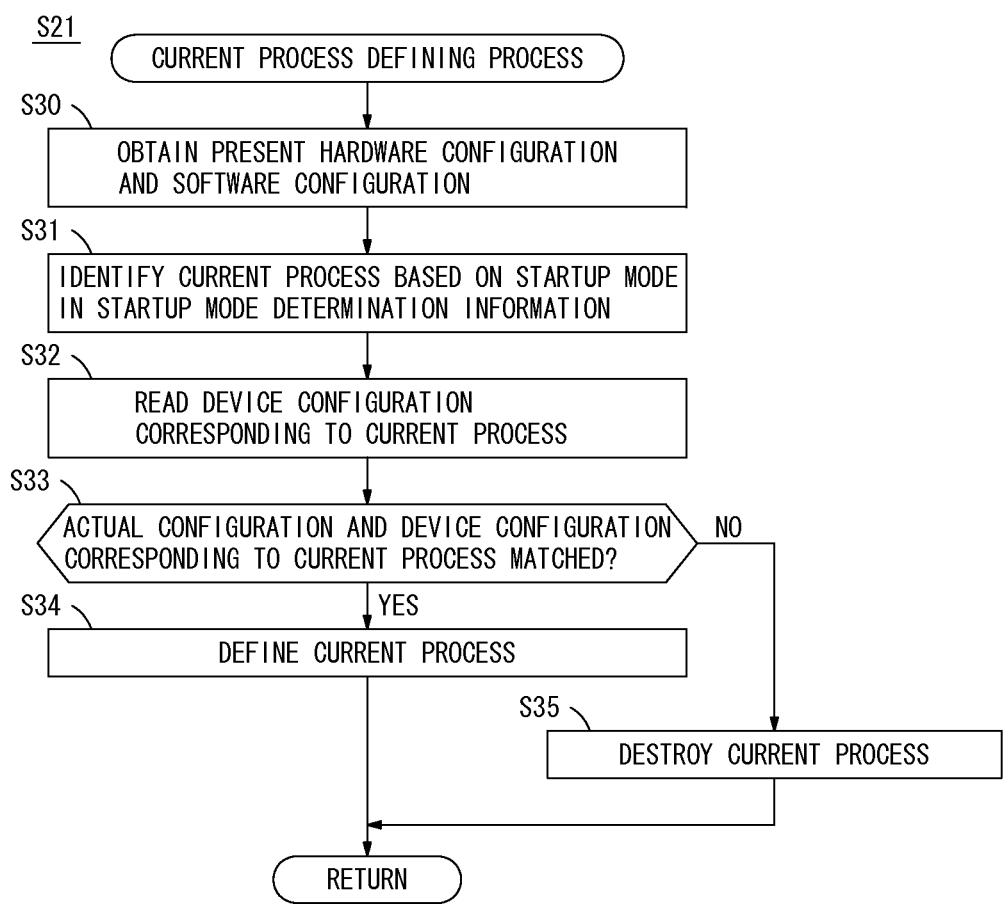
FIG. 9 is a flow diagram explaining in detail an exemplary sequential procedure of a current process defining process.

The sequential procedure of the process performed by the CPU 10 having the above-described configuration is described next. FIGS. 8 and 9 are flow diagrams explaining exemplary sequential procedures of the process performed by the CPU 10 as the information processing device 1 powers on. The flow diagrams of FIGS. 8 and 9 show only the sequential procedures of the process performed in response to the execution of the startup program 11a by the CPU 10. The flow diagrams shown in FIGS. 8 and 9 do not include the sequential procedures of the process performed in response to the execution of the operating system 11b by the CPU 10 after the startup of the operating system 11b by the CPU 10.

Upon the start of the execution of the startup program 11a as shown in FIG. 8, the CPU 10 reads the startup mode determination information 21 in the external storage device 9 (step S10). The CPU 10 determines if the abnormal end information is configured (step S11).

With no abnormal end information configured (when a result of step S11 is NO), the CPU 10 reads the startup mode 21a in the startup mode determination information 21 read in step S10 and identifies the current process (step S12). The CPU 10 obtains the suspend data corresponds to the current process from among the plurality of suspend data 22a, 22b, 22c and 22d stored in the external storage device 9 (step S13). The CPU 10 then performs the hibernation startup using the obtained suspend data (step S14). As the hibernation startup is complete, the operating system 11b has been started up, so that the information processing device 1 becomes operative. The worker then conducts the operations to confirm whether the information processing device 1 operates normally.

In response to the completion of the hibernation startup, the CPU 10 determines whether or not the instruction indicating the completion of the operations is given by the worker (step S15). When the instruction is received, the startup mode 21a in the startup mode determination information 21 is updated (step S16). When the instruction by the worker is not received (when a result of step S15 is NO), the process in step S16 is not executed.

The CPU 10 then determines if the power interruption detecting circuit 44 detects the interruption of the power supply (step S17). As the interruption of the power supply is not detected, the procedure returns to the process in step S15. In cases where the interruption of the power supply is detected (when a result of step S17 is YES), the CPU 10 determines whether or not the startup mode 21a in the startup mode determination information 21 is updated (step S18). When the CPU 10 determines that the startup mode 21a in the startup mode determination information 21 is updated, the process is complete. If the startup mode 21a in the startup mode determination information 21 is not updated, the CPU 10 configures the abnormal end information (step S19) and completes the process.

When it is determined that the abnormal end information is configured as a result of step S11 (when a result of step S11 is YES), the CPU 10 resets the configured abnormal end information (step S20) and executes a current process defining process (step S21).

FIG. 9 is a flow diagram explaining in detail an exemplary sequential procedure of the current process defining process (step S21). As shown in FIG. 9, the CPU 10 obtains the actual hardware configuration and software configuration of the present information processing device 1 (step S30). The CPU 10 identifies the current process registered in the startup mode determination information 21 based on the startup mode 21a in the startup mode determination information 21 (step S31) and reads the device configuration 21c corresponding to the current process (step S32). The CPU 10 then determines if the actual hardware configuration and the software configuration of the present information processing device 1 match the information of the device configuration 21c corresponding to the current process (step S33). If those configurations match with each other (when a result of step S33 is YES), the CPU 10 defines the current process identified based on the startup mode 21a in the startup mode determination information 21 (which is the process identified in step S31) as the correct current process (step S34). If those configurations do not match with each other (when a result of step S33 is NO), it is determined that the current process identified based on the startup mode 21a in the startup mode determination information 21 (which is the process identified in step S31) is not correct. So, the CPU 10 destroys the information as to the current process identified in step S31 (step S35). Thus, the current process defining process is complete.

Referring back to the flow diagram of FIG. 8, the CPU 10 determines whether or not the current process is successfully defined through the current process defining process (step S21) as described above (step S22). When the current process is successfully defined (when a result of step S22 is YES), the CPU 10 moves on to step S12 to read the suspend data corresponding to the current process and perform the hibernation startup as described above (steps S12 to S14).

When the current process is not defined (when a result of step S22 is NO), the CPU 10 determines to start up through the usual startup and starts the usual startup (step S23). In this case, the CPU 10 detects the hardware connected to each respective input/output interface 14 one by one as described above. The CPU 10 then loads the data corresponds to the respective hardware or the software into the RAM 12 by performing computation one by one. It, therefore, takes longer time to complete the startup process than that for hibernation startup. As the usual startup is complete, the operating system 11b has been started. Thus, the information processing device 1 becomes operative.

In response to the completion of the usual startup, the CPU 10 displays an error screen indicating that the current process could not be defined on the operational panel 6 (step S24) and enters a state waiting for an instruction by the worker to specify the correct current process (step S25). As receiving the instruction to specify the current process by the worker (when a result of step S25 is YES), the CPU 10 updates the startup mode 21a in the startup mode determination information 21 (step S26). When not receiving the instruction by the worker (when a result of step S25 is NO), the process in step S26 is not executed.

The CPU 10 determines if the power interruption detecting circuit 44 detects the interruption of the power supply (step S27). When the interruption of the power supply is not detected, the procedure returns to the process in step S25. In cases where the interruption of the power supply is detected (when a result of step S27 is YES), the CPU 10 determines if the startup mode 21a in the startup mode determination information 21 is updated (step S18). With the updated startup mode 21a in the startup mode determination information 21, the process is complete. If the startup mode 21a in the startup mode determination information 21 is not updated, the abnormal end information is configured (step S19), and the process is complete.

When the power switch 41 is turned off by the worker in each process PA1, PA2 and PA3 of the manufacture line building the information processing device 1, the CPU 10 executes the above-described process, thereby starting the operating system 11b up and placing the information processing device 1 into the operation state. Some workers may give the instruction to inform of the completion of the predetermined operations before turning the power switch 41 off. In such cases, the CPU 10 is allowed to quickly put the information processing device 1 into the operation state through the hibernation startup when the power switch 41 is turned back on again in the next process. Thus, improvement of the operation efficiency in each process PA1, PA2 and PA3 is achieved while that of the production efficiency of the information processing device 1 is achieved.

With the sequential procedures of the process explained in the flow diagrams of FIGS. 8 and 9, the usual startup is performed if the information of the device configuration 21c corresponding to the current process identified based on the startup mode 21a in the startup mode determination information 21 does not match the actual hardware configuration and the software configuration of the present information processing device 1. If, for example, the information of the device configuration 21c corresponds to any of the process numbers in the startup mode determination information 21 matches the actual hardware configuration and the software configuration of the present information processing device 1, the CPU 10 may define the current process based on the matched device configuration 21c. With such current process defining process, the CPU 10 is capable of realizing the hibernation startup by identifying the current process even when the worker failed to give the instruction to inform of the completion of the predetermined operations to the information processing device 1 in each process PA1, PA2 and PA3, for instance.

The sequential procedure of the process described above is applicable to not only the process of the manufacture line building the information processing device 1 but also that for the setup operations after the information processing device 1 is carried into the client company.

Figure 10:
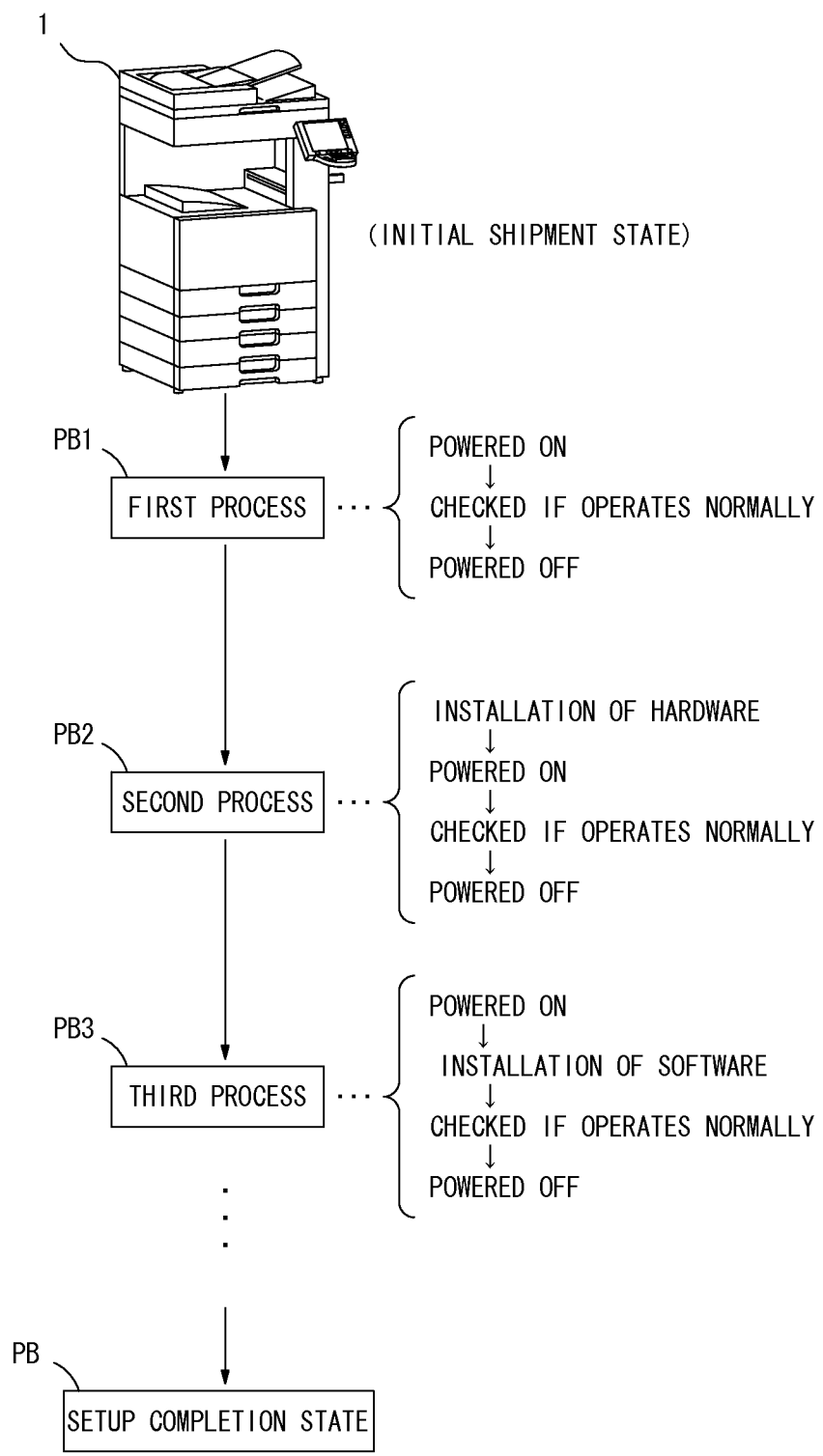
FIG. 10 shows an exemplary operation of powering on and off in each process in setup operations for the information processing device.

Each process in the setup operations for the information processing device 1 is explained next. FIG. 10 shows an exemplary operation of powering on and off in each process in the setup operations for the information processing device 1. The information processing device 1 is come to a setup completion state PB through more than one process including a first process PB1, a second process PB2 and a third process PB3 in the setup operations. The power switch 41 is turned on and off at every installation of the hardware or the software that is the optional device on the information processing device 1 in each process PB1, PB2 and PB3 as shown in FIG. 10.

In the setup operations, the operations in each process is not always conducted in a certain order such as in order of increasing, the first process PB1, the second process PB2 and the third process PB3. It is assumed, for example, the client is not willing to have the hardware such as the fax section 7, the expanded RAM 13 or the advanced function module 18 installed. The client may request for only the installation of the software. So, only the software is installed on the information processing device 1 in the initial state of shipment. In such a case, the second process PB2 is skipped. The operations in the third process PB3 are conducted after those in the first process PB1 according to the example of FIG. 10.

The process the same as one for each manufacture line process PA1, PA2 and PA3 performed in the setup operations does not allow the CPU 10 to identify the current process correctly. When the setup operations are conducted on the information processing device 1 in the initial state of shipment, the CPU 10 executes the startup program 11a to become operative to serve as parts described below.

Figure 11:
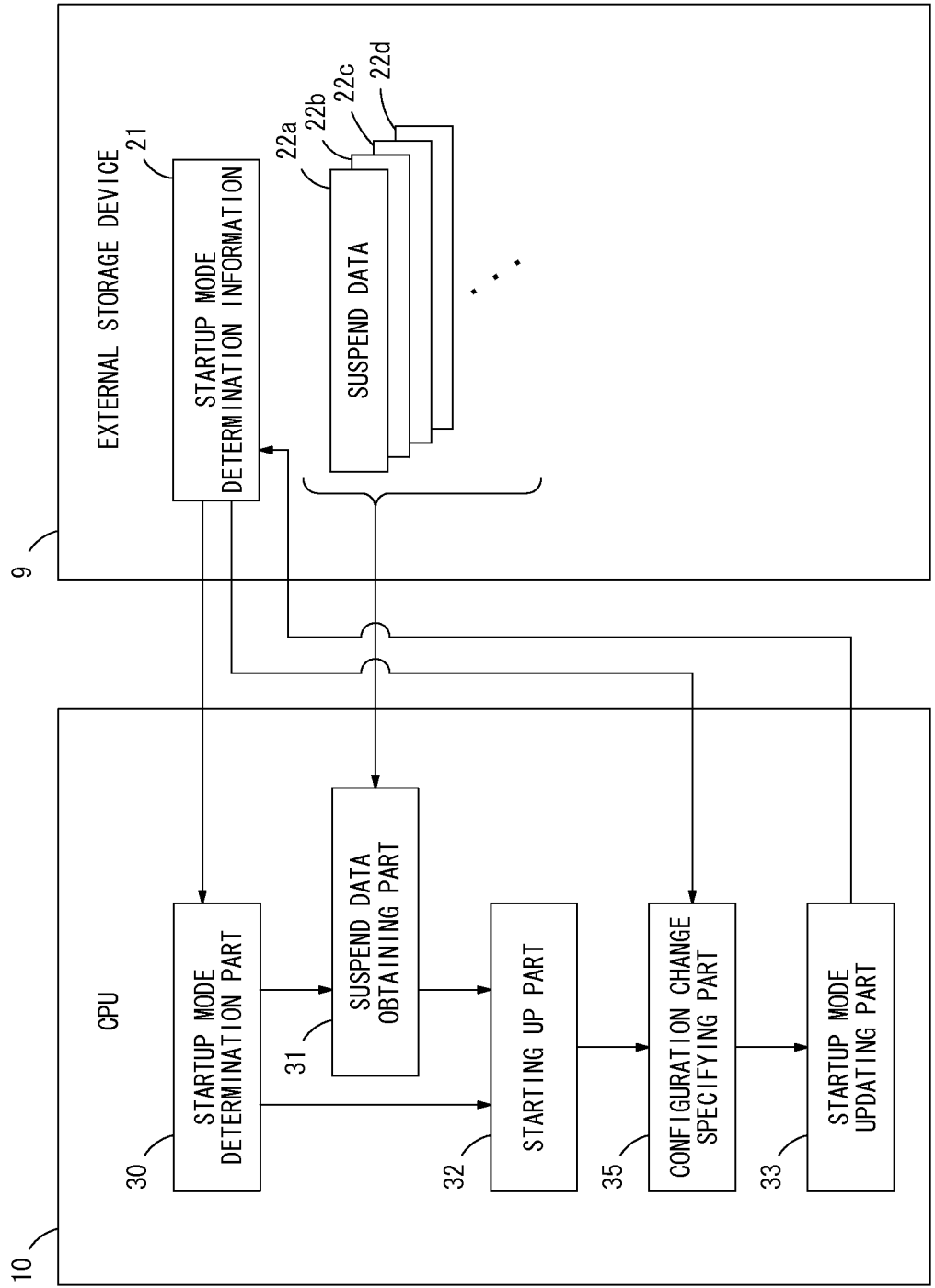
FIG. 11 is a block diagram showing the functional configuration realized by execution of the startup program in the setup operations.

FIG. 11 is a block diagram showing the functional configuration realized by execution of the startup program 11a by the CPU 10 in the setup operations. The CPU 10 serves as the startup mode determination part 30, the suspend data obtaining part 31, the starting up part 32 and the startup mode updating part 33, which is the same as for each manufacture line process PA1, PA2 and PA3. The CPU 10 also serves as the abnormal end configuring part 34, which is also the same as for each manufacture line process PA1, PA2 and PA3. The abnormal end configuring part 34, however, is not shown in FIG. 11.

The CPU 10 serves as a configuration change specifying part 35 in the setup operations, which is different from the functional configuration for each manufacture line process PA1, PA2 and PA3. The operating system 11b is started as the CPU 10 serves as the startup mode determination part 30, the suspend data obtaining part 31 and the starting up part 32, and the information processing device 1 enters the operation state. The configuration change specifying part 35 is put into operation to function after the information processing device 1 enters the operation state. The configuration change specifying part 35 displays a selection screen to select the hardware or the software installed on the information processing device 1 in the current process on the operational panel 6, for example. The configuration change specifying part 35 specifies the configuration newly added to the information processing device 1 based on the hardware or the software selected by the worker.

The configuration change specifying part 35 reads the startup mode determination information 21 and identifies the process number that is associated with the device configuration having the additional configuration newly added to the information of the device configuration 21c corresponding to the current process of the startup mode 21a. After identifying the process number, the configuration change specifying part 35 puts the startup mode updating part 33 into operation, while outputting the identified process number to the startup mode updating part 33. The startup mode updating part 33 records the process number identified by the configuration change specifying part 35 as the startup mode 21a in the startup mode determination information 21, thereby updating the startup mode 21a.

The CPU 10 serves as the configuration change specifying part 35 in the setup operations as described above. So, the suspend data corresponding to the hardware configuration and the software configuration of the present information processing device 1 is read as the power switch 41 is turned on in the next process even when at least one of the process PB1, PB2 and PB3 of FIG. 10 is skipped. Thus, the hibernation startup is successfully performed.

The sequential procedure of the process performed by the CPU 10 in the setup operations is the same as that explained in the flow diagrams of FIGS. 8 and 9. More specifically, in the setup operations, the configuration change specifying part 35 becomes operative in step S15 to execute the above-described process.

The worker turns on the power switch 41 of the information processing device 1 in the setup operations, and he or she may fail to select the hardware or the software added in the process before turning off the power switch 41. Under such circumstance, when the worker turns off the power switch 41, the abnormal end configuring part 34 becomes operative to configure the abnormal end information as explained above. As the information processing device 1 powers back on next, the process the same as for the flow diagrams of FIGS. 8 and 9 is performed. If the hibernation startup is allowed, the information processing device 1 is started up through the hibernation startup.

The information processing device 1 of the present preferred embodiment is capable of performing the startup process using the suspend data as described above. So, the information processing device 1 includes the connection unit 8 to which the external storage device 9 is connected. The external storage device 9 stores therein the startup mode determination information 21 including the startup mode 21a corresponding to the specified hardware configuration and/or software configuration and the plurality types of the suspend data 22a, 22b, 22c and 22d, each type of them corresponds to the respective startup mode.

As powering on, the information processing device 1 reads the startup mode determination information 21 in the external storage device 9 through the connection unit 8 and obtains the suspend data corresponding to the startup mode 21a, thereby starting up through the hibernation startup. After completing the startup process, the information processing device 1 updates the startup mode 21a in the startup mode determination information 21 to correspond to the next process.

The information processing device 1 of the present preferred embodiment is capable of starting up through the hibernation startup corresponds to its present hardware configuration and/or software configuration when being powered on in each process even the hardware or software is newly added in series in each process of the manufacture line or the setup operations. Such hibernation startup allows the quick startup process compared to the usual startup. The operations efficiency in each process of the manufacture line or the setup operations is improved.

According to the present preferred embodiment, the plurality types of startup modes (process numbers), each type of which corresponds to each of the plurality types of hardware configurations and/or software configurations is registered in the startup mode determination information 21 in the external storage device 9. In determination of the startup mode 21a, the information processing device 1 obtains the actual hardware configuration and/or software configuration and determines if the obtained actual hardware configuration and/or software configuration matches any of the plurality types of hardware configurations and/or software configurations registered in the startup mode determination information 21. If it is determined that there is the hardware configuration and/or software configuration matching the actual hardware configuration and/or software configuration, a startup mode of the plurality types of the startup modes registered in the startup mode determination information 21 is selected. If it is determined that none of the hardware configurations and/or software configurations matches the actual hardware configuration and/or software configuration, the information processing device 1 determines to startup through the usual startup without using the suspend data.

As described above, the information processing device 1 is allowed to determine the startup mode based on the actual hardware configuration and/or software configuration. When the startup mode corresponding to the actual hardware configuration and/or software configuration is failed to be determined, the information processing device 1 is started up through the usual startup. It may avoid having an inconvenience from failure of the startup of the information processing device 1.

The information processing device 1 of the present preferred embodiment determines that the predetermined operations are complete in response to the receipt of the information entered through the operational panel 6 after the completion of the startup process. In such cases, the startup mode 21a in the startup mode determination information 21 is updated. The startup mode 21a in the startup mode determination information 21, therefore, is updated to correspond to the next process in response to the normal completion of the operations in each process.

The information processing device 1 may detect the interruption of the power supply while the startup mode 21a in the startup mode determination information 21 is yet to be updated. In such cases, the information processing device 1 of the present preferred embodiment configures the abnormal end information. The information processing device 1, therefore, is allowed to determine that the hibernation startup cannot be performed normally with using the startup mode 21a in the startup mode determination information 21 yet to be updated when it is powered back on.

The information processing device 1 determines the startup mode when being powered on. If the determined startup mode is the startup mode that corresponds to the configurations of the information processing device 1 in the initial state of shipment or the state after the shipment, the information processing device 1 of the present preferred embodiment displays the selection screen for the worker to select the configuration change made in the process. The information processing device 1 also specifies the configuration change based on the information received through the selection screen and updates the startup mode 21a in the startup mode determination information 21 in accordance with the specified configuration change.

As described above, even when the operations conducted in each process is not known in advance, the operations may be specified with the information received through the selection screen. As a result, the startup mode 21a in the startup mode determination information 21 is allowed to be updated in accordance with the operations thereby specified. The information processing device 1 is caused to start up through the hibernation startup corresponding to its hardware configuration and/or software configuration as of then when being powered back on next.

According to the present preferred embodiment, the information processing device reads the startup mode determination information to determine the startup mode as being powered on. The information processing device also obtains the suspend data corresponds to the determined startup mode and performs the startup process using the obtained suspend data. The hardware configuration and/or the software configuration of the information processing device may have been changed when the information processing device is powered on. Even in such cases, the information processing device is allowed to start up through the hibernation startup using the suspend data corresponds to its configuration as of then.

In the present preferred embodiment, the startup mode registered in the startup mode determination information is updated in response to the completion of the startup process. That allows the hibernation startup as the information processing device being powered on next.

The information processing device is powered on and off repeatedly in each manufacture line process or the setup operations, for example. Even when being powered on and off repeatedly, the information processing device of the present preferred embodiment is allowed to start up through hibernation startup every time being powered on and off, resulting in improvement of operation efficiency.

MODIFICATIONS

While the preferred embodiment of the present invention has been described above, the present invention is not limited to the preferred embodiment. Various modifications may be applied to the present invention.

In the preferred embodiment described above, the information processing device 1 is shown to be a device with multiple functions such as one of MFPs. The multiple functions include, for example, the scanner function, the printer function and the copy function. The device is not necessarily the device such as the MFPs. To be more specific, the information processing device 1 may be a device with single function such as devices including a scanner, a printer, a copier and a fax machine. The information processing device 1 may be a device other than the devices mentioned above.

In the above-described present preferred embodiment, the startup mode determination information 21 and the plurality of suspend data 22a, 22b, 22c and 22d are stored in advance in the portable external storage device 9. That external storage device 9 is not necessarily the portable device. The external storage device 9 may be the external hard disk device accessible by the information processing device 1 via the network interface 15, for example.

Furthermore, the startup mode determination information 21 and the plurality of suspend data 22a, 22b, 22c and 22d are not always stored in the external storage device of the information processing device 1. The nonvolatile storage part incorporated in the information processing device 1 may store therein in advance the startup mode determination information 21 and the plurality of suspend data 22a, 22b, 22c and 22d. The startup mode determination information 21 and the plurality of suspend data 22a, 22b, 22c and 22d are data which are used at the operations in the manufacture line or the setup of the information processing device 1 as explained above. The internal storage part of the information processing device 1, however, uses almost all available storage region of the storage part to store therein the data even though the data is not used after the setup operations. In order to avoid having most of the available storage region being used, the startup mode determination information 21 and the plurality of suspend data 22a, 22b, 22c and 22d are preferably stored in the external storage device 9 as described above.

What is claimed is:

1. An information processing device capable of starting up using suspend data, comprising:
    a connection unit connected to a predetermined storage part storing therein startup mode determination information in which a startup mode corresponds to a specified hardware configuration and/or software configuration is configured and a plurality of types of suspend data, each of which corresponds to the respective startup mode;
    a startup mode determination part for reading said startup mode determination information in said storage part through said connection unit and determining the startup mode based on said startup mode determination information in said storage part when being powered on;
    a suspend data obtaining part for selecting the suspend data corresponds to the startup mode determined by said startup mode determination part from among said plurality types of suspend data and obtaining the selected suspend data in said storage part;
    a starting up part for performing a startup process using the suspend data obtained by said suspend data obtaining part; and
    a startup mode updating part for updating the startup mode configured in said startup mode determination information in said storage part after completion of the startup process by said starting up part.

2. The information processing device according to claim 1, wherein
    said storage part is an external storage device allowed to be plugged into said connection unit.

3. The information processing device according to claim 1, wherein
    the plurality types of startup modes, each of which corresponds to each of more than one types of hardware configurations and/or software configurations are registered in said startup mode determination information,
    said startup mode determination part obtains a hardware configuration and/or a software configuration of said information processing device to determine if the obtained hardware configuration and/or software configuration match any of the more than one types of hardware configurations and/or software configurations registered in said startup mode determination information and determines a startup mode of the plurality types of startup modes registered in said startup mode determination information when there is the configuration matched, while determining to perform an usual startup without using the suspend data when there is no configuration matched.

4. The information processing device according to claim 1, further comprising:
    an operation input unit for receiving entries, wherein
    said startup mode updating part updates the startup mode configured in said startup mode determination information when determining based on information received through said operation input unit that predetermined operations are complete after the completion of the startup process by said starting up part.

5. The information processing device according to claim 4, further comprising:
    a detecting part for detecting an interruption of power supply; and an abnormal end configuring part for configuring abnormal end information in response to detection of the interruption of power supply by said detecting part while the startup mode has not been updated by said startup mode updating part, wherein the plurality types of startup modes, each of which corresponds to each of the more than one types of hardware configurations and/or software configurations are registered in said startup mode determination information, and said startup mode determination part, in cases where said abnormal end information has been configured at time of being powered on, obtains the hardware configuration and/or the software configuration of said information processing device to determine if the obtained hardware configuration and/or software configuration matches any of the more than one types of hardware configurations and/or software configurations registered in said startup mode determination information and determines a startup mode of the plurality types of startup modes registered in said startup mode determination information when there is the configuration matched, while determining to perform the usual startup without using the suspend data when there is no configuration matched.

6. The information processing device according to claim 1, further comprising:
a display part on which various types of information are displayed; and
a configuration change specifying part for displaying a selection screen to select a configuration change on said display part and specifying the configuration change based on information received through the selection screen when the startup mode determined by said startup mode determination part at time of being powered on is one corresponds to the configuration in an initial state of shipment or a state after that, wherein
said startup mode updating part, with the configuration change successfully specified by said configuration change specifying part, updates the startup mode configured in said startup mode determination information based on the specified configuration change.

7. An information processing device startup method of starting an information processing device up using suspend data, comprising the steps of:
(a) reading startup mode determination information in which a startup mode corresponds to a specified hardware configuration and/or software configuration is configured in a predetermined storage part in which said startup mode determination information and a plurality of types of suspend data, each of which corresponds to the respective startup modes are stored and determining the startup mode based on said startup mode determination information in said storage part when being powered on;
(b) selecting the suspend data corresponds to the startup mode determined in said step (a) from among said plurality types of suspend data stored in said storage part and obtaining the selected suspend data;
(c) performing a startup process using the suspend data obtained in said step (b); and
(d) updating the startup mode configured in said startup mode determination information in said storage part after completion of the startup process in said step (c).

8. The information processing device startup method according to claim 7, wherein
said storage part is an external storage device allowed to be plugged into a connection unit.

9. The information processing device startup method according to claim 7, wherein
the plurality types of startup modes, each of which corresponds to each of more than one types of hardware configurations and/or software configurations are registered in said startup mode determination information,
in said step (a), a hardware configuration and/or a software configuration of said information processing device is obtained to determine if the obtained hardware configuration and/or software configuration matches any of the more than one types of hardware configurations and/or software configurations registered in said startup mode determination information and a startup mode of the plurality types of startup modes registered in said startup mode determination information is determined when there is the configuration matched, while it is determined to perform an usual startup without using the suspend data when there is no configuration matched.

10. The information processing device startup method according to claim 7, further comprising the step of:
(e) receiving entries by manual operation, wherein
in said step (d), the startup mode configured in said startup mode determination information is updated when it is determined based on information received through said step (e) that predetermined operations are complete after the completion of the startup process in said step (c).

11. The information processing device startup method according to claim 10, further comprising the steps of:
(f) detecting an interruption of power supply; and
(g) configuring abnormal end information in response to detection of the interruption of power supply in said step (f) while the startup mode has not been updated in said step (d), wherein
the plurality types of startup modes, each of which corresponds to each of the more than one types of hardware configurations and/or software configurations are registered in said startup mode determination information, and
in said step (a), in cases where said abnormal end information has been configured at time of being powered on, the hardware configuration and/or the software configuration of said information processing device is obtained to determine if the obtained hardware configuration and/or software configuration matches any of the more than one types of hardware configurations and/or software configurations registered in said startup mode determination information and a startup mode of the plurality types of startup modes registered in said startup mode determination information is determined when there is the configuration matched, while it is determined to perform the usual startup without using the suspend data when there is no configuration matched.

12. The information processing device startup method according to claim 7, further comprising the steps of:
(h) displaying various types of information; and
(i) displaying a selection screen to select a configuration change in said step (h) and specifying the configuration change based on information received through the selection screen when the startup mode determined in said step (a) at time of being powered on is one corresponds to the configuration in an initial state of shipment or a state after that, wherein
in said step (d), with the configuration change successfully specified in said step (i), the startup mode configured in said startup mode determination information is updated based on the specified configuration change.

13. A non-transitory computer readable recording medium on which a startup program is recorded, said startup program starting an information processing device up using suspend data, said startup program causing said information processing device to execute the steps of:
(a) reading startup mode determination information in which a startup mode corresponds to a specified hardware configuration and/or software configuration is configured in a predetermined storage part in which said startup mode determination information and a plurality of types of suspend data, each of which corresponds to the respective startup modes are stored and determining the startup mode based on said startup mode determination information in said storage part when being powered on;
(b) selecting the suspend data corresponds to the startup mode determined in said step (a) from among said plurality types of suspend data stored in said storage part and obtaining the selected suspend data;
(c) performing a startup process using the suspend data obtained in said step (b); and
(d) updating the startup mode configured in said startup mode determination information in said storage part after completion of the startup process in said step (c).

14. The non-transitory computer readable recording medium according to claim 13, wherein
said storage part is an external storage device allowed to be plugged into a connection unit.

15. The non-transitory computer readable recording medium according to claim 13, wherein
the plurality types of startup modes, each of which corresponds to each of more than one types of hardware configurations and/or software configurations are registered in said startup mode determination information,
in said step (a), a hardware configuration and/or a software configuration of said information processing device is obtained to determine if the obtained hardware configuration and/or software configuration matches any of the more than one types of hardware configurations and/or software configurations registered in said startup mode determination information and a startup mode of the plurality types of startup modes registered in said startup mode determination information is determined when there is the configuration matched, while it is determined to perform an usual startup without using the suspend data when there is no configuration matched.

16. The non-transitory computer readable recording medium according to claim 13, said startup program causing said information processing device to further execute the step of:
(e) receiving entries by manual operation, wherein
in said step (d), the startup mode configured in said startup mode determination information is updated when it is determined based on information received through said step (e) that predetermined operations are complete after the completion of the startup process in said step (c).

17. The non-transitory computer readable recording medium according to claim 16, said startup program causing said information processing device to further execute the steps of:
(f) detecting an interruption of power supply; and
(g) configuring abnormal end information in response to detection of the interruption of power supply in said step (f) while the startup mode has not been updated in said step (d), wherein
the plurality type of startup modes, each of which corresponds to each of the more than one types of hardware configurations and/or software configurations are registered in said startup mode determination information, and
in said step (a), in cases where said abnormal end information has been configured at time of being powered on, the hardware configuration and/or the software configuration of said information processing device is obtained to determine if the obtained hardware configuration and/or software configuration matches any of the more than one types of hardware configurations and/or software configurations registered in said startup mode determination information and a startup mode of the plurality types of startup modes registered in said startup mode determination information is determined when there is the configuration matched, while it is determined to perform the usual startup without using the suspend data when there is no configuration matched.

18. The non-transitory computer readable recording medium according to claim 13, said startup program causing said information processing device to further execute the steps of:
(h) displaying various types of information; and
(i) displaying a selection screen to select a configuration change in said step (h) and specifying the configuration change based on information received through the selection screen when the startup mode determined in said step (a) at time of being powered on is one corresponds to the configuration in an initial state of shipment or a state after that, wherein
in said step (d), with the configuration change successfully specified in said step (i), the startup mode configured in said startup mode determination information is updated based on the specified configuration change.

* * * * *